A. R. CHAPPELL & E. S. ORMSBY.
SELF OILING ENGINE.
APPLICATION FILED MAY 9, 1910.
992,163.
Patented May 16, 1911.
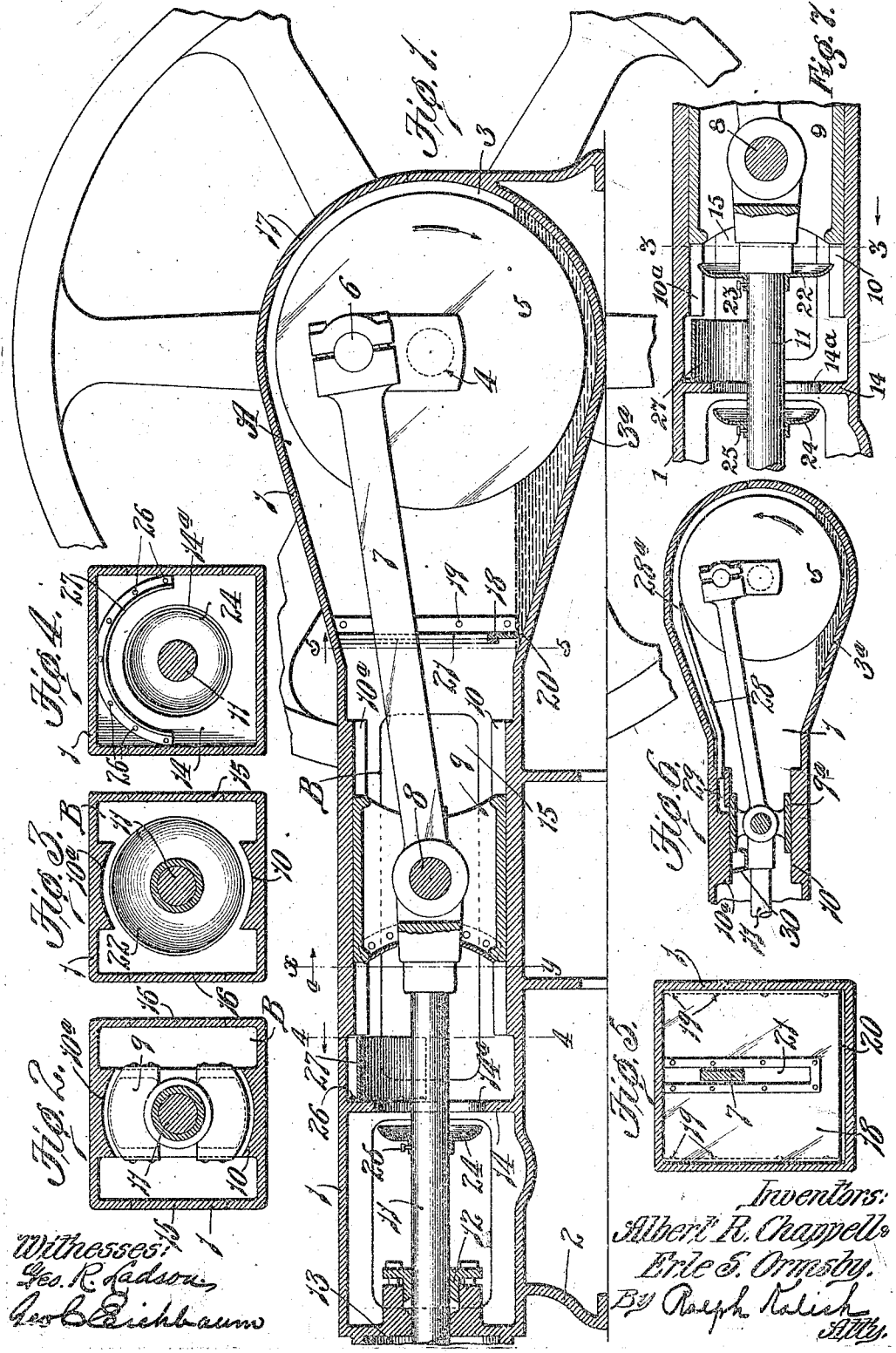
Witnesses:
Geo. R. Ladson
Geo. Eichbaum
Inventors:
Albert R. Chappell
Erle S. Ormsby
By Ralph Kalish
Atty.

UNITED STATES PATENT OFFICE.

ALBERT R. CHAPPELL AND ERLE S. ORMSBY, OF ST. LOUIS, MISSOURI.

SELF-OILING ENGINE.

992,163.

Specification of Letters Patent. Patented May 16, 1911.

Application filed May 9, 1910. Serial No. 560,137.

*To all whom it may concern:*

Be it known that we, ALBERT R. CHAPPELL and ERLE S. ORMSBY, citizens of the United States, residing at the city of St. Louis, State of Missouri, have jointly invented a new and useful Improvement in Self-Oiling Engines, of which the following is a specification, reference being had to the accompanying drawings, forming a part hereof, in which—

Figure 1 is a longitudinal sectional view through the casing of an engine, showing our invention arranged therein; Fig. 2 is a cross sectional view on the line $x-y$, Fig. 1, looking in the direction of the arrow $a$; Fig. 3 is a cross sectional view on the line 3—3, Fig. 7; Fig. 4 is a cross sectional view on the line 4—4, Fig. 1; Fig. 5 is a cross sectional view on the line 5—5, Fig. 1; Fig. 6 is a longitudinal sectional view through a part of the casing of an engine, showing a modified form of our invention; and Fig. 7 is a fragmentary sectional view through a portion of the casing of an engine, showing our invention in connection with a slightly modified form of cross-head.

This invention relates to a new and useful improvement in self-oiling engines, and more particularly in means for preventing the entrance of oil or other lubricant from the casing of an engine into the steam cylinders thereof.

In self-oiling engines of the kind or class to which our invention is particularly applicable, that is to say, engines equipped with a splash-system of lubrication, two grades or kinds of oil or other lubricant are usually employed—a comparatively heavy and better grade or kind of oil being used in and for the cylinder and its associate parts than in the crank-case for lubricating the movable or moving parts therein. The oil generally used in the crank-case is also lighter in weight than the cylinder oil and has no lubricating properties when used on parts under steam pressure or when introduced with steam; and whenever this crankcase oil is allowed to enter or finds entrance into the cylinder (and this has heretofore frequently occurred), the lubricating properties of the cylinder oil become materially affected and reduced, the efficiency of the engine being also thereby affected and proportionately lowered. Further, and now referring particularly to plants for the manufacture of ice, it is well known that the steam from the engine cylinder or cylinders is afterward condensed and, by due process, frozen. In such plants having self-oiling engines of the class mentioned, it has been found that the cylinder oil is readily separable from this water of condensation before this water is frozen, but that the crank-case oil is not so separable. Consequently, again, whenever this case oil is allowed to enter or finds entrance into the cylinder (and this has heretofore frequently occurred), the ice afterward made from the water of condensation from such engines is impure, due to the presence of this case oil therein, and is hardly fit to use.

The object of our invention is, therefore, broadly to provide means particularly applicable for use in self-oiling engines of the class stated whereby this crank-case oil, while allowed to thoroughly lubricate the moving or movable parts in the casing of the engine, is prevented from working into or entering the steam cylinder or cylinders of the engine.

With this object in view, our invention consists in the novel construction of the several parts thereof and in the novel arrangement and combination of the same, all as will hereinafter be described and afterward pointed out in the claims.

In the drawings, wherein like reference characters refer to like parts throughout the several views, 1 indicates the casing of an engine, which is suitably supported upon a base 2. This casing 1 may be of any approved construction and is preferably substantially rectangular throughout the greater part of its length, one, or the rear, end thereof, as at 3, being, however, enlarged and substantially circular (see particularly Fig. 1). Suitably rotatably mounted in said end 3 of casing 1 is a crankshaft 4 having arranged thereupon a suitable crank-disk 5 adapted to rotate therewith in said end 3 of casing 1. Suitably connected to said crank-shaft 4 by a crankpin 6 is a connecting-rod 7, the other end of said connecting-rod 7 being pivotally connected by a cross-head pin or wrist-pin 8 to a cross-head 9 slidable on guides 10—10ᵃ in casing 1. Also connected to said cross-head 9 is a piston-rod 11 adapted, on the rotation of crank-shaft 4, to reciprocate through a suitable stuffing-box 12 and in a cylinder 13

(partly shown), all such parts being of any approved construction. The casing 1 is also preferably provided near the forward end thereof with a partition-wall 14 provided with a suitable opening, as at 14ª, through which the said piston 11 is adapted to pass. The casing 1 between wall 14 and cylinder 13 is usually open or cut-away at its sides, and the chamber of said casing inclosing the movable parts therein hereinbefore referred to is provided with removable sections, as at 15 and 16, whereby access may be had to said movable parts. A removable section 17 is also preferably provided in the end 3 of casing 1 whereby oil or other lubricant may be poured into said end 3 of casing 1.

The lower part or bottom of said end 3 of casing 1 provides a basin or receptacle, as at 3ª, for oil or other lubricant, this oil or other lubricant being poured thereinto through the opening provided by said removable section 17. In high speed self-oiling engines of the class stated the crank-shaft usually revolves in the direction of the arrow, see particularly Fig. 1, and on the rotation of said crank-shaft the oil or other lubricant in basin 3ª will be splashed by said crank-disk 5 directly onto the moving parts of the engine in casing 1. Notwithstanding the provision of a stuffing box through which the piston rod of an engine usually passes, this oil in basin 3 lodging on said piston rod has heretofore worked into the cylinder, with the results hereinbefore referred to. To prevent the working of this case oil into the cylinder and to thereby obviate the results mentioned, we provide a partition wall 18 separating said casing 1 into two compartments—a compartment A for the crank-disk 5 and a compartment B for the cross head. This partition wall 18, which is preferably of any sheet material, is suitably attached, as by rivets 19, to the side walls of casing 1, a small space, as at 20, being left between the bottom of said wall and the bottom of said casing, whereby oil splashed into said chamber B may afterward escape back into said basin 3ª. This partition wall 18, see particularly Fig. 5, is provided with an enlarged elongated slot 21, through and in which slot said connecting-rod 7 is adapted to pass and move, and through which slot oil splashed by said crank-disk 5 on the rotation of crank-shaft 4 is adapted to pass into chamber B and directly on to cross-head 9 and guides 10 and 10ª. The wall 18 prevents the oil from said basin 3ª, splashed as stated by said crank-disk 5, being distributed generally through compartment B, said slot 21 being of such a length and width as to be not only adapted to permit said connecting-rod 7 to freely move therein, but also to permit a sufficient amount or quantity of oil, so splashed by said crank-disk 5, to pass therethrough into said compartment B and to direct such oil directly upon the parts to be lubricated.

The cross-head 9 may be either closed or opened. Should the forward end of the cross-head in the engine be closed as shown in Fig. 1, the oil so splashed into the compartment B and onto said cross-head, will, to a great extent, be prevented thereby from passing farther forwardly into said chamber B. Should the forward end of the cross-head in the engine, however, be open, we provide on the piston rod 11 a preferably metallic cylindrical concaved pan 22, as shown in Fig. 7, this pan 22 being soldered or otherwise suitably secured to said piston-rod as, for instance, by a set-screw 23. This pan 22, in the case of an open cross-head, will, likewise to a great extent, prevent the oil so splashed into compartment B passing farther forwardly in said compartment, such oil being caught by said pan and afterward dripping therefrom onto the bottom of said compartment B. On the reciprocation of said cross-head, however, the oil splashed into said compartment B and onto said cross-head 9 and guides 10 and 10ª, will be spread on said guides 10 and 10ª and on the rearward stroke of the cross-head 9 the oil or other lubricant will drop from said upper guide 10ª onto said piston 11. To prevent such oil thus dropping onto said piston-rod from working into said cylinder 13 on the reciprocation of said piston-rod, we provide on said piston-rod a preferably metallic concaved cylindrical pan 24, this pan 24 being soldered or otherwise suitably secured to said piston-rod, as, for instance, by a set-screw 25, the opening 14ª in said wall 14 being of sufficient diameter to permit the passage therethrough of said pan 24 on the reciprocation of said piston-rod. This pan 24 is so positioned on said piston-rod that on the rearward stroke of said cross-head 9 said pan will preferably aline with the forward end of the guides 10 and 10ª and, should any oil thus drop from said top guide 10ª onto the portion of said piston-rod between said cross-head and said pan 24, said pan 24 will absolutely prevent such oil working forwardly on said piston rod. And to prevent any oil so splashed into said compartment B from dripping from the top of said compartment onto that portion of said piston-rod 11 forwardly of said pan 24 when said cross-head is at the end of its rearward stroke, we suitably secure, as by means of rivets 26, to said wall 14 a preferably sheet metal semi-cylindrical shield 27. This shield 27 extends rearwardly to substantially the forward end of top or upper guide 10ª, the end thereof alining substantially with said pan 24 when said cross-head is at the end of its rearward stroke, this shield 27 serving to deflect any oil dripping from the top of said compartment B downwardly into the bottom of said compartment and away from said piston-rod.

By means of the construction described, the portion of the piston-rod 11 which reciprocates in said cylinder 13 is kept practically absolutely clean and free from any oil or other lubricant used, as described, in the casing of the engine, whereby any possibility of such case oil or other lubricant entering said cylinder on or with said piston-rod is prevented. Our construction is comparatively simple, may be readily arranged upon any engine of the class stated, and fully accomplishes the object hereinbefore mentioned and, should the engine be used in a plant for the manufacture of ice, the ice made from the water of condensation, as hereinbefore referred to, will be pure and of high grade.

In Fig. 6 we have shown a slightly modified form of our invention as applied particularly to low-speed self-oiling engines of the class stated. In low-speed engines of this class, the splashing of the oil in basin 3ª by the crank-disk 5 is comparatively slight, and usually the crank-disk 5 rotates in the direction as indicated by the arrow, that is to say, from left to right. In this class of engines, the partition-wall 18 hereinbefore mentioned may be done away with, and we suitably arrange in said casing a small pipe or duct 28 having at one end a knife-edge 28ª adapted to bear closely upon said crank-disk 5. On rotation of said crank-disk, the oil in basin 3ª will be carried around on said disk 5 and taken therefrom by said knife-edge 28ª and led through said pipe or duct 28 into a passage 29 onto cross-head 9°, whereby said cross-head 9ª and guides 10 and 10ª will be thoroughly lubricated. As said cross-head 9ª reciprocates slowly there is very little, if any, splashing of the oil forwardly into the said casing, and therefore said pan 24 and shield 27 may be provided or done away with as occasion requires. To prevent any oil dropping from said top guide 10ª, however, onto said piston-rod we suitably arrange on said piston-rod forwardly of said cross-head 9ª a suitable trough-shaped pan 30, whereby any oil dripping from said top guide 10ª or the top of said cross-head 9ª will be caught by said pan 30 and led to the sides and bottom of casing 1 away from said piston-rod, the portion of said piston-rod reciprocating in said cylinder 13, being thereby kept entirely clean and free from oil.

As our invention has heretofore been used by us in connection with self-oiling engines of the class stated, and for which use, as has been hereinbefore mentioned, it is particularly applicable, it has been herein shown and described in that connection, but it is to be understood that our invention, or parts thereof, might equally well be applied to, or used in connection with, engines of other kinds and that minor changes in construction, arrangement and combination in the several parts of our invention can be made and substituted for those herein shown and described without departing from the nature and principle of our invention.

Having thus described our invention, what we claim and desire to secure by Letters Patent is—

1. In a self-oiling engine of the class stated, the combination with a casing provided with an oil basin at one end, of a crank-shaft mounted in said casing, a connecting-rod pivotally connected to said crank-shaft, guides in said casing, a cross-head pivotally connected to said connecting-rod and slidable on said guides, a cylinder, a piston-rod connected to said cross-head and adapted to reciprocate in said cylinder, means adapted on the rotation of said crank-shaft to splash the oil in said basin, and means adapted to prevent oil dripping on to said piston-rod; substantially as described.

2. In a self-oiling engine of the class stated, the combination with a casing provided with an oil basin at one end, of a crank-shaft mounted in said casing, a connecting-rod pivotally connected to said crank-shaft, guides in said casing, a cross-head pivotally connected to said connecting-rod and slidable on said guides, a cylinder, a piston-rod connected to said cross-head and adapted to reciprocate in said cylinder, means adapted on the rotation of said crank-shaft to splash the oil in said basin, and a shield adapted to prevent oil dripping from the top of said casing on to said piston-rod; substantially as described.

3. In a self-oiling engine of the class stated, the combination with a casing provided with an oil basin at one end, of a crank-shaft mounted in said casing, a connecting-rod pivotally connected to said crank-shaft, guides in said casing, a cross-head pivotally connected to said connecting-rod and slidable on said guides, a cylinder, a piston-rod connected to said cross-head and adapted to reciprocate in said cylinder, means adapted on the rotation of said crank-shaft to splash the oil in said basin, a shield adapted to prevent oil dripping from the top of said casing on to said piston-rod, and a pan arranged on and movable with said piston-rod adapted to prevent oil on said piston rod working into said cylinder; substantially as described.

4. In a self-oiling engine of the class stated, the combination with a casing provided with an oil basin at one end, of a crank-shaft mounted in said casing, means adapted on the rotation of said crank-shaft to splash the oil in said basin, a connecting-rod pivotally connected to said crank-shaft, guides in said casing, a cross-head pivotally connected to said connecting-rod and slidable on said guides, a cylinder, a piston-rod connected to said cross-head and adapted to reciprocate in said cylinder on the rotation of said crank-shaft, means in said casing adapted to limit the amount of oil splashed from said basin onto said cross-head and guides, means arranged on and movable with said piston-rod adapted to prevent oil on said piston-rod working into said cylinder, and means in said casing adapted to prevent oil dripping from the top of said casing onto said piston-rod; substantially as described.

5. In a self-oiling engine of the class stated, the combination with a casing provided with an oil-basin at one end, of a crank-shaft rotatably mounted in said casing, means adapted on the rotation of said crank-shaft to splash the oil in said basin, a connecting-rod pivotally connected to said crank-shaft, guides in said casing, a cross-head pivotally connected to said connecting-rod and slidable on said guides, a cylinder, a piston-rod connected to said cross-head and adapted to reciprocate in said cylinder on the rotation of said crank-shaft, means in said casing adapted to limit the amount of oil splashed from said basin onto said cross-head and guides, means arranged on and movable with said piston-rod adapted to prevent oil on said piston-rod working into said cylinder, and a shield arranged in said casing adapted to prevent oil dripping from the top of said casing onto said piston-rod; substantially as described.

6. In a self-oiling engine of the class stated, the combination with a casing provided with an oil basin at one end, of a crank-shaft rotatably mounted in said casing, means adapted to splash the oil in said basin on the rotation of said crank-shaft, a connecting-rod pivotally connected to said crank-shaft, guides in said casing, a cross-head pivotally connected to said connecting-rod and slidable on said guides, a cylinder, a piston-rod connected to said cross-head and adapted to reciprocate in said cylinder on the rotation of said crank-shaft, a wall in said casing between said oil-basin and guides, said wall being provided with an elongated slot and adapted to limit the amount of oil splashed from said basin onto said cross-head and guides, a pan arranged on and movable with said piston-rod adapted to prevent oil on said piston-rod working into said cylinder, and a semi-cylindrical shield arranged in said casing over said piston rod and adapted to prevent oil dripping from the top of said casing onto said piston-rod; substantially as described.

In testimony whereof, we have signed our names to this specification in the presence of two subscribing witnesses.

ALBERT R. CHAPPELL.
ERLE S. ORMSBY.

Witnesses:
CAROLINE L. WEBER,
GEORGE C. EICHBAUM.